US012463378B2

(12) United States Patent
Cox

(10) Patent No.: US 12,463,378 B2
(45) Date of Patent: Nov. 4, 2025

(54) CONNECTOR ASSEMBLY

(71) Applicant: Siemens Energy Global GmbH & Co. KG, Munich (DE)

(72) Inventor: Thomas Cox, Ulverston (GB)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 361 days.

(21) Appl. No.: 18/351,556

(22) Filed: Jul. 13, 2023

(65) Prior Publication Data

US 2024/0030650 A1 Jan. 25, 2024

(30) Foreign Application Priority Data

Jul. 21, 2022 (GB) ..................................... 2210677

(51) Int. Cl.

| | |
|---|---|
| ***H01R 13/52*** | (2006.01) |
| ***E21B 17/02*** | (2006.01) |
| ***E21B 47/00*** | (2012.01) |
| ***H01R 13/523*** | (2006.01) |
| ***H01R 13/622*** | (2006.01) |
| ***H01R 43/26*** | (2006.01) |

(52) U.S. Cl.

CPC ....... *H01R 13/5219* (2013.01); *E21B 17/028* (2013.01); *H01R 13/523* (2013.01); *H01R 13/622* (2013.01); *H01R 43/26* (2013.01); *E21B 47/00* (2013.01)

(58) Field of Classification Search

CPC .............. H01R 13/5219; H01R 13/523; H01R 13/622; H01R 13/5227; E21B 17/028; E21B 47/00

USPC ................................ 439/277, 190, 205, 206

See application file for complete search history.

(56) References Cited

U.S. PATENT DOCUMENTS 6,017,227 A * 1/2000 Cairns .................. G02B 6/3816 439/138
9,028,264 B2 * 5/2015 Head .................... H01R 13/523 439/190
9,071,008 B2 * 6/2015 Zillinger ............. H01R 13/533
(Continued)

FOREIGN PATENT DOCUMENTS

| | | |
|---|---|---|
| EP | 2929224 B1 | 9/2018 |
| GB | 2604884 A | 9/2022 |
| WO | 9967501 A2 | 12/1999 |

*Primary Examiner* — Gary F Paumen

(57) ABSTRACT

A connector assembly (30) for use in subsea environments comprises a plug (32) and a receptacle (34) generally arranged about a longitudinal axis (36). The plug (32) comprises a plug body (38) through which a down hole gauge cable (40) extends. The receptacle (34) comprises a receptacle body (42) and through which a supply cable (44) extends for connection with the down hole gauge cable (40). The plug (32) and the receptacle (34) are secured together via a securing nut (48). The plug (32) and the receptacle (34) are in contact and form a primary seal (70). A rotary test adaptor (46) is located radially outwardly of and is sealed against an outer surface (110) of the plug body (38) and is located radially inwardly of and is sealed against a radially inner surface (108) of the securing nut (48). The rotary test adaptor (46) comprises an outer surface (51) and an inner surface (116) and a test port (50), the test port (50) extends through the rotary test adaptor (46) from the outer surface (51) to the inner surface (116) and is in fluid communication with the primary seal (70).

15 Claims, 4 Drawing Sheets

(56) References Cited

U.S. PATENT DOCUMENTS

| | | | | |
|---|---|---|---|---|
| 10,287,826 | B2 * | 5/2019 | Ma | E21B 17/00 |
| 2010/0062628 | A1 * | 3/2010 | Steele | H02G 15/04 29/458 |
| 2011/0000677 | A1 | 1/2011 | Overfield | |
| 2022/0170812 | A1 | 6/2022 | McKay et al. | |

* cited by examiner

CONNECTOR ASSEMBLY

FIELD OF INVENTION

The present invention relates to a connector assembly having a rotatory test adaptor for pressure testing. The connector assembly is suitable for use in subsea or other corrosive environments. The connector assembly is suitable for electrical or optical connectors.

BACKGROUND

When installing a connector into an interface, it is necessary to carry out pressure tests to ensure the seals are properly engaged. Two tests are required; the first to verify that seals on the down hole gauge cable have engaged correctly (a rear seal test) and the second to verify the plug and receptacle are mated correctly and a primary seal is satisfactory (an inter-seal test). The primary seal is an elastomeric seal.

One example of a connector is a dry mate down hole connector of the Applicant's ElecTRON® connector system. This connector is assembled and pressure tested on site, often in difficult environmental conditions such as on the drilling platform of an oil rig.

FIG. 1 shows a known dry mate connector pair 10 comprising a dry mate plug 14 and a dry mate receptacle 12. The dry mate receptacle 12 is usually mounted in a customer's interface. A threaded retaining nut 16 secures the dry mate plug 14 and the dry mate receptacle 12 together. The dry mate plug 14 has a test port 18 that is perpendicular to a longitudinal axis of the dry mate connector pair 10. The dry mate connector pair 10 is, as typical in the industry, generally cylindrical and so lacks an orientation feature. This means that the test port 18 can be in any position around 360° of the axis 24 of the connector pair 10. Additionally, a customer may have multiple interfaces located around a large diameter pipe. As such, access to the test port 18 of each of a number of dry mate connector pairs 10 is difficult and can impede carrying out the pressure tests.

The rear seal test and the inter-seal test can be carried out individually and separately or by testing both seals simultaneously. Testing can be carried out using the single test port 18 with complex internal ducting to allow the test port 18 to access the two volumes under test namely the inter-seal, which is the joint, generally indicated by arrow 20, between the dry mate plug 14 and the dry mate receptacle 12, and the rear seals generally located as indicated by arrow 22.

Thus, there is a desire to provide an improved connector assembly for use in subsea environments and installation in difficult environments.

SUMMARY OF INVENTION

One object of the present invention is to provide a connector that is easier to test for seal integrity. Another object of the present invention is to provide a connector that is simpler and quicker to connect. Another object of the present invention is to provide a connector assembly with an improved primary seal.

The above objects are achieved by a connector assembly (30) for use in subsea environments. The connector assembly comprises a plug (32) and a receptacle (34) generally arranged about a longitudinal axis (36). The plug (32) comprises a plug body (38) through which a down hole gauge cable (40) extends. The receptacle (34) comprises a receptacle body (42) and through which a supply cable (44) extends for connection with the down hole gauge cable (40). The plug (32) and the receptacle (34) are secured together via a securing nut (48). The plug (32) and the receptacle (34) are in contact and form a primary seal (70). A rotary test adaptor (46) is located radially outwardly of and is sealed against an outer surface (110) of the plug body (38) and is located radially inwardly of and is sealed against a radially inner surface (108) of the securing nut (48). The rotary test adaptor (46) comprises an outer surface (51) and an inner surface (116) and a test port (50), the test port (50) extends through the rotary test adaptor (46) from the outer surface (51) to the inner surface (116) and is in fluid communication with the primary seal (70). The rotary test adaptor (46) is rotatable about the longitudinal axis and relative to the plug and/or receptacle.

The plug (32) may extend into the receptacle (34). The plug (32) may define a sealing surface (65) and the receptacle (34) may define a sealing surface (67). The sealing surface (65) may be in contact with the sealing surface (67) which forms the primary seal (70), preferably the receptacle (34) and the plug (32) are metallic, and the primary seal (70) is formed between the metallic sealing surfaces (65, 67).

A secondary seal (72) may be located between a forward end (68) of the receptacle body (42) and a forward end (62) of the plug body (38). The secondary seal (72) may be located downstream, relative to a leakage path between the receptacle body (42) and the plug body (38), of the primary seal (70). The secondary seal (72) may be formed from an elastomeric material.

A first test seal (76) may be located, in a radial direction, between the rotary test adaptor (46) and the plug body (38). A second test seal (80) may be located, in a radial direction, between the rotary test adaptor (46) and the securing nut (48). A third test seal (84) may be located, in a radial direction, between the receptacle body (42) and the securing nut (48).

A spacer (92) may be located, in an axial direction, between the rotary test adaptor (46) and the plug body (38).

A stop (94) may be located, in a radial direction, between the plug body (38) and the securing nut (48). The stop (94) may be arranged to limit relative axial movement between the plug body (38) and the securing nut (48).

The stop (94) may be a split ring. A flange (96) may extend radially inwardly from the securing nut (48). The stop (94) may sit in a groove (98) formed in the radially outer surface (110) of the plug body (38). The flange (96) abuts the split ring.

The stop (94) may be a threaded collar (118) which engages with a cooperating thread (120) formed in a radially outer surface (110) of the plug body (38). The flange (96) abuts the threaded collar (118).

The stop (94) may be a bolt or a dowel (112). A threaded hole (100) or a plain hole (100) or a groove (101) is formed in the radially outer surface (110) of the plug body (38). A through-hole (114) is formed in the securing nut (48) and through which the bolt or a dowel (112) passes to engage with the threaded hole (100) or a plain hole (100) or a groove (101).

A first plug seal (54) and a second plug seal (56) may be provided to seal between the plug body (38) and the down hole gauge cable (40). A test port (52) extends generally radially through the plug body (38), having an outlet (104) on the radially inner surface (106) of the plug body 38. The outlet (104) is located between the first plug seal (54) and the second plug seal (56).

In a second aspect of the present invention, there is provided a method of assembling a connector assembly (30) as described above, the method comprises the steps, fitting the first test seal (76) and the second test seal (80) to rotary test adaptor (46), fitting the third test seal (84) to the receptacle body (42), translating the rotary test adaptor (46) onto the plug body (38), translating the securing nut (48) onto plug body (38), fitting the stop (94) to the plug body (38), rotating the securing nut (48) relative to the receptacle body (42) to engage the threaded connection (90) whereby the sealing surface (65) contacts the sealing surface (67) to form the primary seal (70).

The method may comprise the steps, translating the securing nut (48) to contact the stop (94), translating the rotary test adaptor (46) to contact against the securing nut (48), fitting the spacer (92) to the plug body (38).

In a third aspect of the present invention, there is provided a method of pressure testing a connector assembly (30) as described above, wherein the method comprises the steps: rotating the rotary test adaptor (46) such that the primary test port (50) is accessible, securing pressure test apparatus to the primary test port (50), passing a pressurized fluid through the primary test port (50) and into contact with the primary seal (70), determining the primary seal (70) is satisfactorily sealed.

The method of pressure testing a connector assembly (30) may comprise the steps: securing pressure test apparatus to the plug test port (52), passing a pressurized fluid through the plug test port (52), determining whether the primary plug seal (54) and the secondary plug seal (56) are satisfactorily sealed.

BRIEF DESCRIPTION OF THE DRAWINGS

The above-mentioned attributes and other features and advantages of the present invention and the manner of attaining them will become more apparent and the present technique itself will be better understood by reference to the following description of embodiments of the present technique taken in conjunction with the accompanying drawings, wherein.

DETAILED DESCRIPTION OF INVENTION

Figure 1:
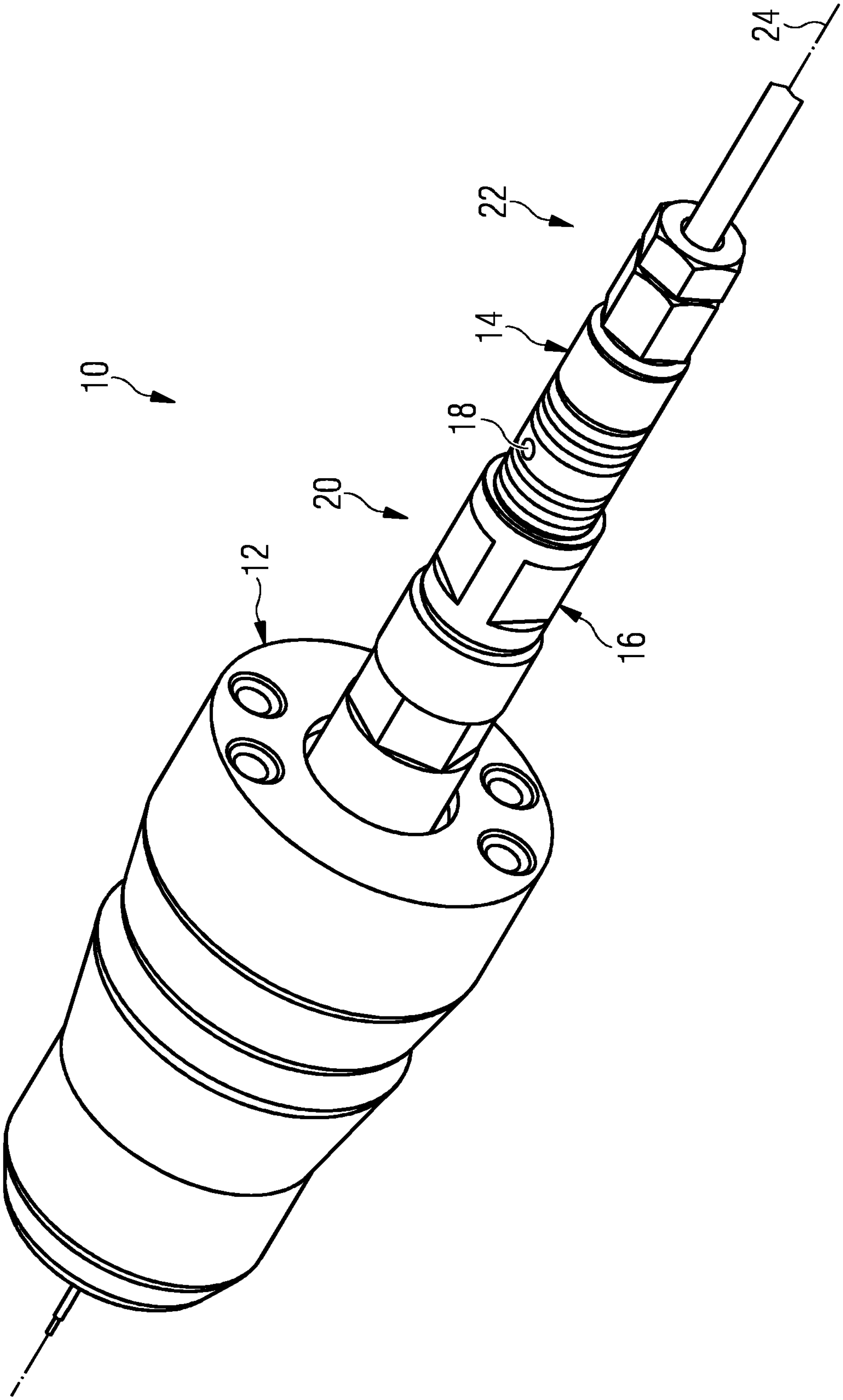
FIG. 1 is a view on a known connector and as described above.
Figure 2:
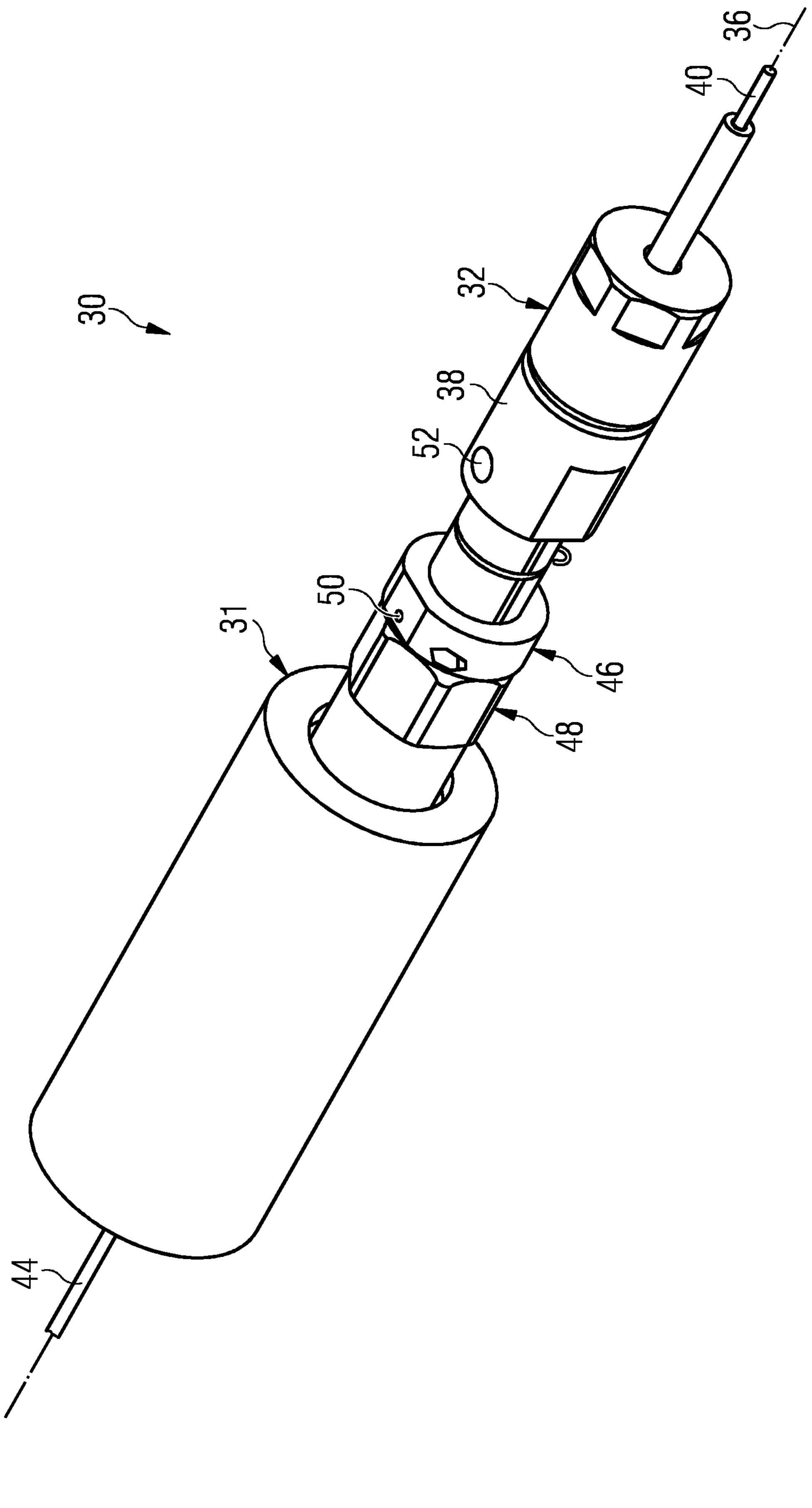
FIG. 2 is a view on a first embodiment of the connector assembly and in accordance with the present invention.

FIG. 2 is a perspective view on a connector assembly 30 in accordance with the present invention. The connector assembly 30 comprises a plug 32 and a receptacle 34 (see FIG. 3) generally arranged about a longitudinal axis 36. The receptacle 34 is mounted in a customer's interface 31. The plug 32 and the receptacle 34 are generally elongate along the longitudinal axis 36. The plug 32 comprises a plug body 38 through which a down hole gauge cable 40 extends. The receptacle 34 comprises a receptacle body 42 (see FIG. 3) and through which a supply cable 44 extends. The down hole gauge cable 40 and the supply cable 44 are connected by any conventional or future arrangement. A rotary test adaptor 46 sealingly engages on an outer surface of the plug body 38 and sealing engages on an inner surface of a securing nut 48. The rotary test adaptor 46 comprises a primary test port 50, to which pressure test equipment 122 can be attached. The plug body 38 comprises a secondary test port 52, to which pressure test equipment 122 can be attached.

Figure 3:
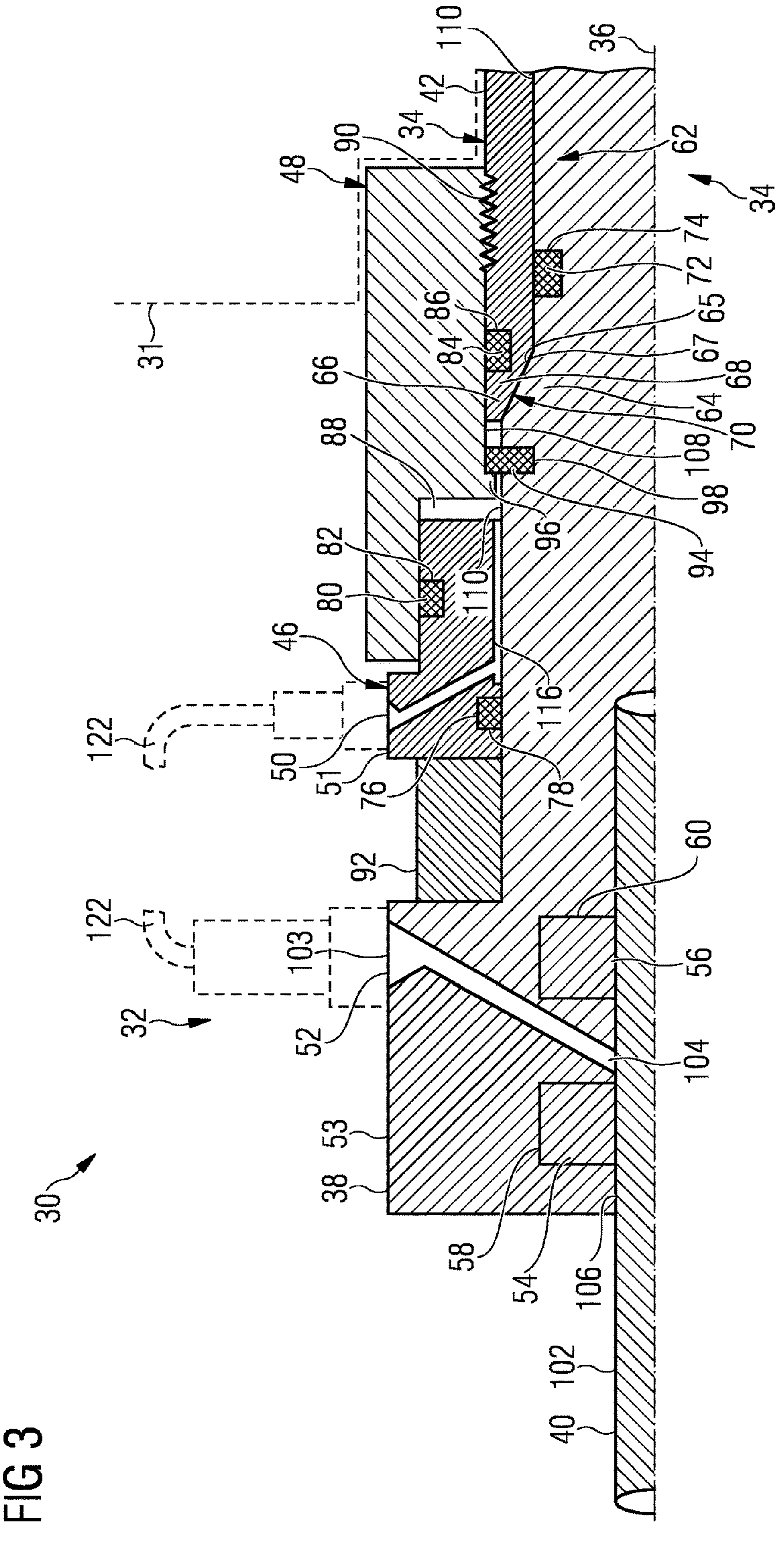
FIG. 3 is a section through the first embodiment of the connector assembly and in accordance with the present invention.

Referring now to FIG. 3 which is a section through the connector assembly 30 of FIG. 2. The securing nut 48 is attached to the receptacle body 42, in this example by a threaded connection 90 where a radially outer surface of the receptacle body 42 is threaded to cooperate with a thread on the radially inner surface of the securing nut 48.

A spacer 92 is located between the rotary test adaptor 46 and the plug body 38 to prevent axial movement, in the direction towards the left in FIG. 3, of the rotary test adaptor 46. The spacer 92 is a split ring, but in other examples may be two or more circumferential segments attached together by known means such as latches, clips, circlips, overlaps bolted together.

A stop 94 provides an axial position for the securing nut 48 relative to the plug body 38. A flange 96 on the radially inner surface 108 of the securing nut 48 abuts the stop 94 to prevent further movement in the axial direction towards the right in FIG. 3. The stop 94 extends radially outwardly from the plug body 38. In this example, the stop 94 is a split ring and which sits in a groove 98 formed in the radially outer surface 110 of the plug body 38.

The plug body 38 has a first plug seal 54 and a second plug seal 56 which seal against the down hole gauge cable 40 and prevent the ingress of fluids to the interior of the connector assembly 30. The two plug seals 54, 56 are metallic and are permanently deformed during installation to cold weld themselves onto the metal sheath (surface 102) of the DHG cable 40.

Generally, the plug 32 extends into the receptacle 34 such that the downhole gauge cable 40 and the supply cable 44 connect together. Specifically, when the plug 32 and the receptacle 34 are connected, a forward end 68 of the receptacle body 42 overlaps or surrounds a forward end 62 of the plug body 38. In this example, the plug body 38 defines a tapered portion 64 and which is generally a truncated cone shape. The receptacle body 42 defines a corresponding tapered portion 66, which is generally a truncated cone shape, in the forward end 68. The two tapered portions 64, 66 define sealing surfaces 65, 67 respectively. The two tapered portions 64, 66 are arranged such that their sealing surfaces 65, 67 respectively are in contact and form a primary seal 70.

The primary seal 70 may be formed by other configurations of sealing surfaces of the plug body 38 and receptacle body 42. A secondary seal 72 is located between the forward end 68 of the receptacle body 42 and the forward end 62 of the plug body 38. In this example, the secondary seal 72 is located partly within a groove 74 defined in the forward end 62 of the plug body 38, but in other examples the secondary seal 72 may be located partly within a groove defined in the forward end 68 of the receptacle body 42.

The primary seal 70 prevents the ingress of fluid into the volume immediately surrounding the electrical connection between the downhole gauge cable 40 and the supply cable 44. The secondary seal 72 is a backup seal to the primary seal 70. In terms of potential fluid ingress and leakage path between the receptacle body 42 and the plug body 38, the secondary seal 72 is downstream of the primary seal 70. The secondary seal 72 is an O-ring and is elastomeric or other known deformable material as known in the art.

A first test seal 76 is located between the rotary test adaptor 46 and the plug body 38, the first test seal 76 is located in a groove 78 in the rotary test adaptor 46, but in other embodiments the groove may be formed in the plug body 38. A second test seal 80 is located between the rotary test adaptor 46 and the securing nut 48, the second seal 80 is located in a groove 82 in the rotary test adaptor 46, but in other embodiments the groove 82 may be formed in the securing nut 48. A third test seal 84 is located between the forward end 68 of the receptacle body 42 and the securing nut 48, the third seal 84 is located in a groove 86 in the forward end 68 of the receptacle body 42, but in other embodiments the groove 86 may be formed in the securing nut 48.

The first, second and third test seals 76, 82, 84 are generally O-ring seals and may be formed at least partly from an elastomeric or similar material. These test seals 76, 82, 84 may be disposable after each pressure test and replaced by new test seals for subsequent pressure tests, thereby ensuring good sealing for the pressure tests. These test seals 76, 82, 84 may be formed from hydrogenated nitrile rubber (HNBR) and as such are cost effective.

The rotary test adaptor 46 has a primary test port 50 in its radially outer surface 51. The primary test port 50 is provided to conduct pressure tests for the primary seal 70. A test volume 88 is formed between the rotary test adaptor 46, the securing nut 48, the plug body 38 and the receptacle body 42 and which is sealed by the first, second and third test seals 76, 82, 84 and the primary seal 70. The primary test port 50 is in fluid communication with the test volume 88. It is the intention that the primary seal 70 is tested via a pressurized fluid passed through the primary test port 50 and into the test volume 88 and therefore the pressurised fluid is forced against the primary seal 70.

The primary seal 70 is formed by the plug body 38 and the receptacle body 42 which are both metallic. It is preferable that the primary seal 70 is metallic because the metals used are very capable of resisting the corrosive environment of well bore fluids. The primary seal 70 may be formed of any suitably corrosion resistant material (for example materials which are ISO 15156 compliant) such as Inconel® 625 & 718. The primary seal 70 is otherwise part of a potential leak path from the well bore to the environment and so this seal's reliability is very important.

The plug body 38 defines a second test port 52 having an opening 103 in a radially outer surface 53 of the plug body 38. The test port 52 extends generally radially through the plug body 38, having an outlet 104 on the radially inner surface 106 of the plug body 38. The outlet 104 is located between the primary plug seal 54 and the secondary plug seal 56. The test port 52 is provided to conduct pressure tests for the two plug seals 54, 56. It is the intention that the two plug seals 54, 56 are tested via a pressurized fluid passed through the test port 52. The test fluid applies reverse direction pressure to the primary plug seal 54 and in the normal direction pressure to the secondary plug seal 56 as each would experience pressurised fluid in service.

To assemble the first embodiment of the connector assembly comprises the following method steps are undertaken, fitting the first test seal 76 and the second test seal 80 to rotary test adaptor 46, fitting the third test seal 84 to the receptacle body 42, sliding or axially translating the rotary test adaptor 46 onto the plug body 38, sliding or axially translating the securing nut 48 onto plug body 38, fitting the stop 94 to the plug body 38, in this first embodiment the stop 94 is a split ring and which may be secured via a circlip or similar, sliding or axially translating the securing nut 48 to abut or contact the stop 94, slide or axially translate the rotary test adaptor 46 against the securing nut 48, fitting the spacer 92 to the plug body 38 and secure the spacer 92 to the plug body 38, rotating the securing nut 48 relative to the receptacle body 42 to engage the threaded connection 90 whereby the sealing surface 65 contacts the sealing surface 67 to form the primary seal 70.

Figure 4:
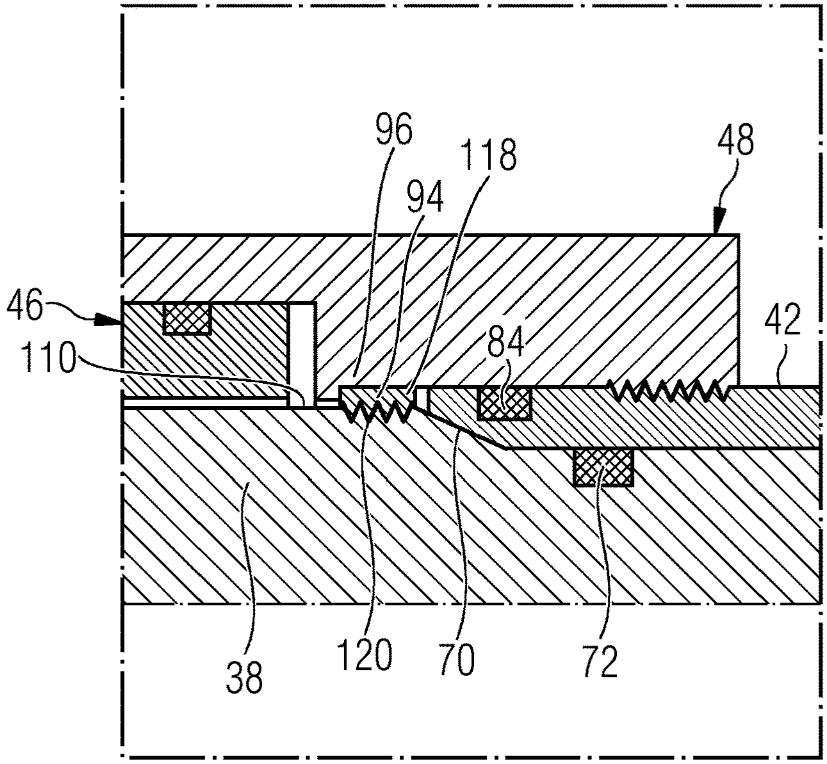
FIG. 4 is a partial section through a second embodiment the connector assembly and in accordance with the present invention.

Referring now to FIG. 4, a second embodiment of the connector assembly 30 is shown and where like reference numerals are used to denote the same components as shown in FIG. 3 unless stated otherwise. Here, instead of the stop 94 being a split collar arrangement, the stop 94 is a threaded collar or ring 118. A cooperating thread 120 is formed in the radially outer surface 110 of the plug body 38 and which is engaged by the corresponding thread on the radially inner surface of the threaded collar 120.

To assemble the second embodiment of the connector assembly 30 the following steps are undertaken, fitting the first test seal 76 and the second test seal 80 to rotary test adaptor 46, fitting the third test seal 84 to the receptacle body 42, sliding or axially translating the rotary test adaptor 46 onto the plug body 38, sliding or axially translating securing nut 48 onto plug body 38, fitting the stop 94 to the plug body 38, which in this embodiment is a threaded collar; the threaded collar being rotated or screwed onto the corresponding thread on the plug body in the direction from right to left as shown in FIG. 4, sliding or axially translating the securing nut 48 to abut or contact the stop 94, sliding or axially translating the rotary test adaptor 46 against the securing nut 48, fitting the spacer 92 to the plug body 38 and secure the spacer 92 to the plug body 38, rotating the securing nut 48 relative to the receptacle body 42 to engage the treaded connection 90 whereby the sealing surface 65 contact the sealing surface 67 to form the primary seal 70.

Figure 5:
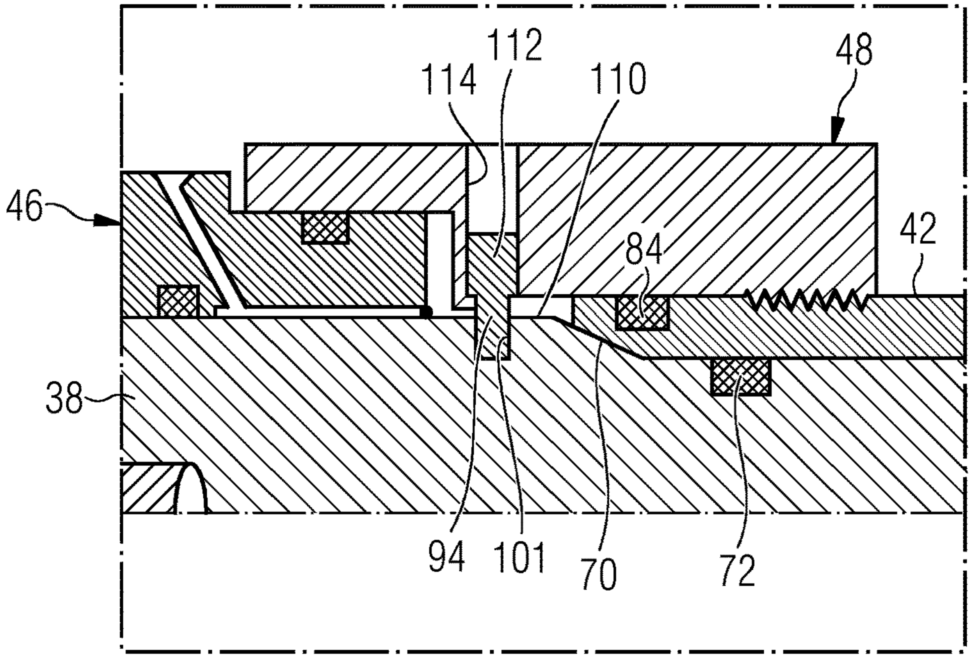
FIG. 5 is a partial section through a third embodiment the connector assembly and in accordance with the present invention.

Referring now to FIG. 5, a third embodiment of the connector assembly 30 is shown and where like reference numerals are used to denote the same components as shown in FIG. 3 unless stated otherwise. Here, instead of the stop 94 being a split collar arrangement, the stop 94 is a bolt or a dowel. A through-hole 114, generally radially aligned, is formed in the securing nut 48 and through which the bolt or a dowel 112 passes to engage with groove 101 respectively formed in the plug body 38. In both cases of the bolt or dowel a number of each may be provided to engage the groove 101 around the circumference of the plug body 38. The bolt or dowel prevents the securing nut 48 and the plug body 38 from relative movement in the axial direction (left or right directions in the Figure) and therefore also prevents relative axial movement between the receptacle 32 and the plug 34. In this embodiment, the spacer 92 of the FIGS. 3 and 4 embodiments, is not required because the bolt or dowel 112 prevents relative movement in both axial directions.

To assemble the third embodiment of the connector assembly 30 the method comprises the following steps,

- fitting the first test seal 76 and the second test seal 80 to rotary test adaptor 46,
- fitting the third test seal 84 to the receptacle body 42,
- sliding or axially translating the rotary test adaptor 46 onto the plug body 38,
- sliding or axially translating securing nut 48 onto plug body 38,
- fitting the stop 94 to the plug body 38, which in this embodiment is the bolt or dowel by inserting either into the groove 101 in the plug body 38,
- sliding or axially translating the rotary test adaptor 46 against the securing nut 48,
- fitting the spacer 92 to the plug body 38 and secure the spacer 92 to the plug body 38,
- rotating the securing nut 48 relative to the receptacle body 42 to engage the threaded connection 90 whereby the sealing surface 65 contact the sealing surface 67 to form the primary seal 70.

Any of the three embodiments of the pressure testing arrangements, once installed to the connector assembly 30, is pressure tested to ensure that the primary seal 70 and secondary seal 72 are sealing satisfactorily. The method of pressure testing comprises the steps,

- fitting the plug 32 to the receptacle 34,
- where necessary, rotating the rotary test adaptor 46 such that the primary test port 50 is accessible,
- securing pressure test apparatus to the primary test port 50,
- passing the pressurized fluid through the primary test port 50 and into the test volume 88,
- determining the primary seal 70 is satisfactorily sealed.

The pressure test equipment, method of assembling the connector assembly 30 and method of pressure testing means that it is not necessary to orientate the plug 38 or receptacle 34, even if possible, during assembly because the rotary test adaptor 46 may be rotated easily so that the primary test port 50 is easily accessible.

Pressure testing of the first plug seal 54 and the second plug seal 56 may occur before, after or at the same time as pressure testing of the primary seal 70. Indeed, once the plug 32 has been assembled to the downhole gauge cable 40 the pressure testing may be completed. The method of testing the primary plug seal 54 and the secondary plug seal 56 comprises the steps

- securing pressure test apparatus to the plug test port 52,
- passing the pressurized fluid through the plug test port 52,
- determining whether the primary plug seal 54 and the secondary plug seal 56 are satisfactorily sealed.

The plug 32 may be assembled to the downhole gauge cable 40 in any orientation about the axis 36 and therefore plug test port 52 may be located for ease of access. This pressure testing may be done either or both on site at a customer's location or in the factory.

The pressure test is pressure monitored where a known pressure is applied and then locked off from the pressure generating equipment. The pressure is monitored over a period of time and must not drop more than a specified amount, for example, by no more than 0.25 psi over 1 hour. Once the pressure test has been successfully completed, test port 52 is sealed with a metal seal and test port 50 is left open. The test port 50 is left open because if it were sealed, the elastomeric test seals would become primary seals and the metal seal 70 would become a secondary seal which is not desirable.

The presently described pressure testing arrangements has the following benefits:

- provides the customer with a primary metal seal that is tested in the direction that the primary seal will experience in service,
- allows the customer to build the plug 32 in advance without having concerns about the alignment of the plug 32 on the down hole gauge cable 40,
- allows for cheap 'disposable' O-rings to be used for the seals 78, 80 and 84 to create an external sealed area to the primary seal 70 rather than expensive O-rings that can withstand the production environment. These 'disposable' O-rings may be made from a significantly cheaper material such as hydrogenated nitrile rubber (HNBR),
- allows use with the current test method favoured by customers.

All the features disclosed in this specification (including any accompanying claims, abstract and drawings), and/or all the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A connector assembly (30) for use in subsea environments comprises:

- a plug (32) and a receptacle (34) generally arranged about a longitudinal axis (36),
- the plug (32) comprises a plug body (38) through which a down hole gauge cable (40) extends,
- the receptacle (34) comprises a receptacle body (42) and through which a supply cable (44) extends for connection with the down hole gauge cable (40),
- the plug (32) and the receptacle (34) are secured together via a securing nut (48),
- the plug (32) and the receptacle (34) are in contact and form a primary seal (70),
- a rotary test adaptor (46) is located radially outwardly of and is sealed against an outer surface (110) of the plug body (38) and is located radially inwardly of and is sealed against a radially inner surface (108) of the securing nut (48),
- the rotary test adaptor (46) comprises an outer surface (51) and an inner surface (116) and a test port (50), the test port (50) extends through the rotary test adaptor (46) from the outer surface (51) to the inner surface (116) and is in fluid communication with the primary seal (70).

2. The connector assembly (30) as claimed in claim 1 wherein,

- the plug (32) extends into the receptacle (34), the plug (32) defines a sealing surface (65) and the receptacle (34) defines a sealing surface (67), the sealing surface

(65) is in contact with the sealing surface (67) which forms the primary seal (70), preferably the receptacle (34) and the plug (32) are metallic, and the primary seal (70) is formed between the metallic sealing surfaces (65, 67).

3. The connector assembly (30) as claimed in claim 1 wherein, a secondary seal (72) is located between a forward end (68) of the receptacle body (42) and a forward end (62) of the plug body (38), the secondary seal (72) is located downstream, relative to a leakage path between the receptacle body (42) and the plug body (38), of the primary seal (70), preferably the secondary seal (72) is an elastomeric material.

4. The connector assembly (30) as claimed in claim 1 wherein, a first test seal (76) is located, in a radial direction, between the rotary test adaptor (46) and the plug body (38), a second test seal (80) is located, in a radial direction, between the rotary test adaptor (46) and the securing nut (48), a third test seal (84) is located, in a radial direction, between the receptacle body (42) and the securing nut (48).

5. The connector assembly (30) as claimed in claim 1 wherein, a spacer (92) is located, in an axial direction, between the rotary test adaptor (46) and the plug body (38).

6. The connector assembly (30) as claimed in claim 1 wherein, a stop (94) is located, in a radial direction, between the plug body (38) and the securing nut (48), the stop (94) is arranged to limit relative axial movement between the plug body (38) and the securing nut (48).

7. The connector assembly (30) as claimed in claim 6 wherein, the stop (94) is a split ring, a flange (96) extends radially inwardly from the securing nut (48), the stop (94) sits in a groove (98) formed in the radially outer surface (110) of the plug body (38), the flange (96) abuts the split ring.

8. The connector assembly (30) as claimed in claim 6 wherein, the stop (94) is a threaded collar (118) which engages with a cooperating thread (120) formed in a radially outer surface (110) of the plug body (38), the flange (96) abuts the threaded collar (118).

9. The connector assembly (30) as claimed in claim 6 wherein, the stop (94) is a bolt or a dowel (112), a threaded hole (100) or a plain hole (100) or a groove (101) is formed in the radially outer surface (110) of the plug body (38)

a through-hole (114) is formed in the securing nut (48) and through which the bolt or a dowel (112) passes to engage with the threaded hole (100) or a plain hole (100) or a groove (101).

10. The connector assembly (30) as claimed in claim 1 wherein, a first plug seal (54) and a second plug seal (56) are provided to seal between the plug body (38) and the down hole gauge cable (40), a test port (52) extends generally radially through the plug body (38), having an outlet (104) on the radially inner surface (106) of the plug body 38, the outlet (104) is located between the first plug seal (54) and the second plug seal (56).

11. A method of assembling a connector assembly (30) as claimed in claim 1, the method comprises the steps of:

fitting a first test seal (76) and a second test seal (80) to a rotary test adaptor (46), fitting a third test seal (84) to the receptacle body (42), translating the rotary test adaptor (46) onto the plug body (38), translating the securing nut (48) onto the plug body (38), fitting a stop (94) to the plug body (38), rotating the securing nut (48) relative to the receptacle body (42) to engage a threaded connection (90) whereby a first sealing surface (65) contacts a second sealing surface (67) to form the primary seal (70).

12. The method of claim 11, further comprising:

translating the securing nut (48) to contact the stop (94), translating the rotary test adaptor (46) to contact against the securing nut (48), and fitting a spacer (92) to the plug body (38).

13. The method of claim 11, further comprising:

rotating the rotary test adaptor (46) such that the primary test port (50) is accessible, securing a pressure test apparatus to the primary test port (50), passing a pressurized fluid through the primary test port (50) and into contact with the primary seal (70), and determining the primary seal (70) is satisfactorily sealed.

14. The method of claim 11, further comprising:

securing a pressure test apparatus to a plug test port (52), passing a pressurized fluid through the plug test port (52), determining whether a primary plug seal (54) and a secondary plug seal (56) are satisfactorily sealed.

15. The method of claim 11, further comprising:

locating a secondary seal (72) between a forward end (68) of the receptacle body (42) and a forward end (62) of the plug body (38), the secondary seal (72) is located downstream, relative to a leakage path between the receptacle body (42) and the plug body (38), of the primary seal (70), the secondary seal (72) formed from an elastomeric material.

* * * * *